(12) United States Patent
Ren

(10) Patent No.: US 10,819,835 B2
(45) Date of Patent: Oct. 27, 2020

(54) MOBILE COMMUNICATION DEVICE

(71) Applicant: AAC Acoustic Technologies (Shenzhen) Co., Ltd., Shenzhen (CN)

(72) Inventor: Zhang Ren, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/528,637

(22) Filed: Aug. 1, 2019

(65) Prior Publication Data
US 2020/0045151 A1   Feb. 6, 2020

(30) Foreign Application Priority Data

Aug. 4, 2018   (CN) ..................... 2018 2 1256048 U

(51) Int. Cl.
*H04M 1/02*   (2006.01)

(52) U.S. Cl.
CPC .................. *H04M 1/026* (2013.01)

(58) Field of Classification Search
CPC ...... H04M 1/026; H04M 1/0266; H04M 1/03; H04M 1/035; H04M 1/0202
USPC ............................................ 455/566, 575.1
See application file for complete search history.

(56) References Cited

U.S. PATENT DOCUMENTS

| 2008/0176609 | A1* | 7/2008 | Kim ..................... | H04M 1/035 |
| | | | | 455/575.1 |
| 2015/0226585 | A1* | 8/2015 | Yang ................... | G01D 11/245 |
| | | | | 73/431 |
| 2016/0062391 | A1* | 3/2016 | Choi ..................... | G06F 1/1652 |
| | | | | 361/679.03 |
| 2018/0164850 | A1* | 6/2018 | Sim ......................... | G06F 1/165 |

\* cited by examiner

*Primary Examiner* — Marcus Hammonds
(74) *Attorney, Agent, or Firm* — W&G Law Group LLP

(57) ABSTRACT

A mobile communication device is provided. The mobile communication device includes: a housing; a screen covering the housing and enclosing a receiving space together with the housing; and a microphone assembly received in the receiving space. The screen is provided with a sound inlet passing through the screen. The microphone assembly includes a sound guiding portion fixed in the receiving space, a sound guiding channel passing through the sound guiding portion, and a microphone bonded to the sound guiding portion. The sound guiding channel has one end facing right towards and communicating with the sound inlet. The microphone is bonded to the sound guiding portion and communicates with another end of the sound guiding channel, and sound is transmitted into the sound guiding channel through the sound inlet and then transmitted to the microphone through the sound guiding channel.

5 Claims, 4 Drawing Sheets

MOBILE COMMUNICATION DEVICE

TECHNICAL FIELD

The present disclosure relates to the field of communication technologies, and in particular, to a mobile communication device.

BACKGROUND

With the advent of the mobile Internet era, the number of smart mobile devices rises increasingly. Among many mobile devices, mobile communication devices such as mobile phones are undoubtedly the most common and portable mobile terminals.

The mobile communication device in the related art includes a housing, a screen covers the housing and encloses a receiving space with the housing, a speaker and a microphone that are received in the receiving space for respectively receiving and transmitting a call. However, in the mobile communication device of the related art, the speaker and the microphone are both provided at the bottom end of the housing, and communicate with outside by forming a through hole at a side of the bottom end of the housing.

However, in this configuration, when a person uses a mobile communication device to talk, since the through hole is provided at a side of the bottom end of the housing, voice can only be directly transmitted by facing right towards the screen, and cannot be transmitted by directly facing the microphone and the speaker. Especially, the microphone cannot directly pick up the voice, so that when receiving the voice, the microphone may also receive some ambient noise, thereby affecting voice quality of the mobile communication device.

Therefore, it is necessary to provide a new mobile communication device to solve the above technical problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
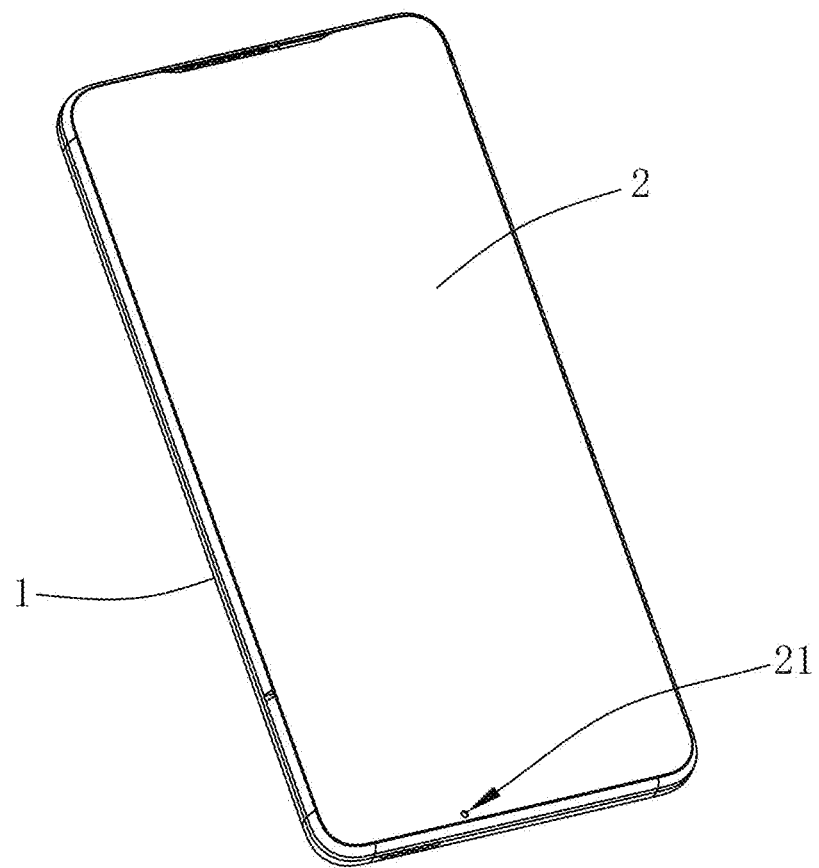
FIG. 1 is a perspective structural schematic view of a mobile communication device according to an embodiment of the present disclosure.
Figure 2:
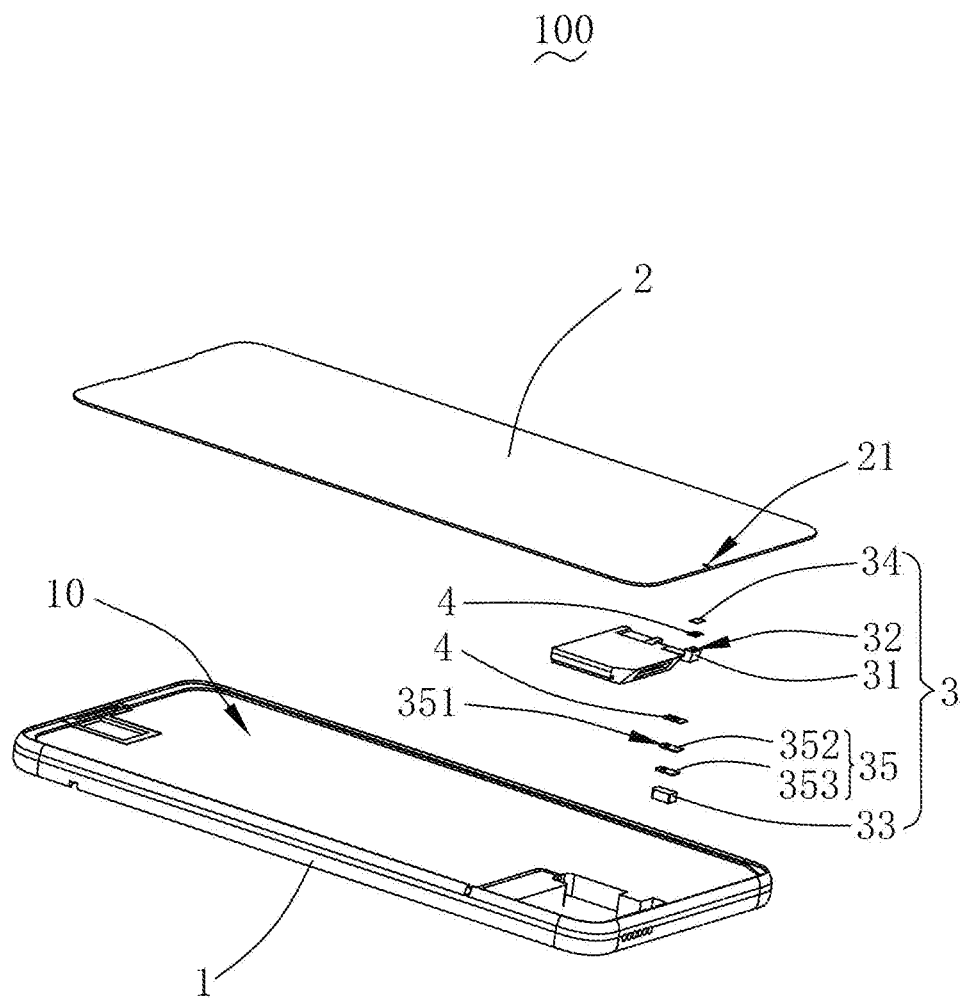
FIG. 2 is an exploded view showing a three-dimensional structure of a mobile communication device according to an embodiment of the present disclosure.

Referring to FIGS. 1-2, the present disclosure provides a mobile communication device 100. The mobile communication device 100 includes a housing 1, a screen 2, and a microphone assembly 3.

The screen 2 is provided to cover the housing 1 and form a receiving space 10 together with the housing 1. In this embodiment, the screen 2 is provided with a sound inlet 21 passing through the screen 2. The sound inlet 21 may be provided at a bottom end of the screen 2.

The microphone assembly 3 is received and fixed in the receiving space 10.

Figure 3:
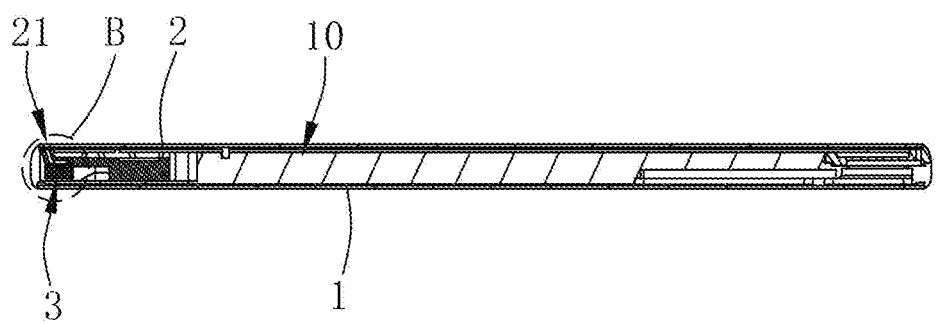
FIG. 3 is a cross-sectional view of the mobile communication device in FIG. 1 taken along line A-A.
Figure 4:
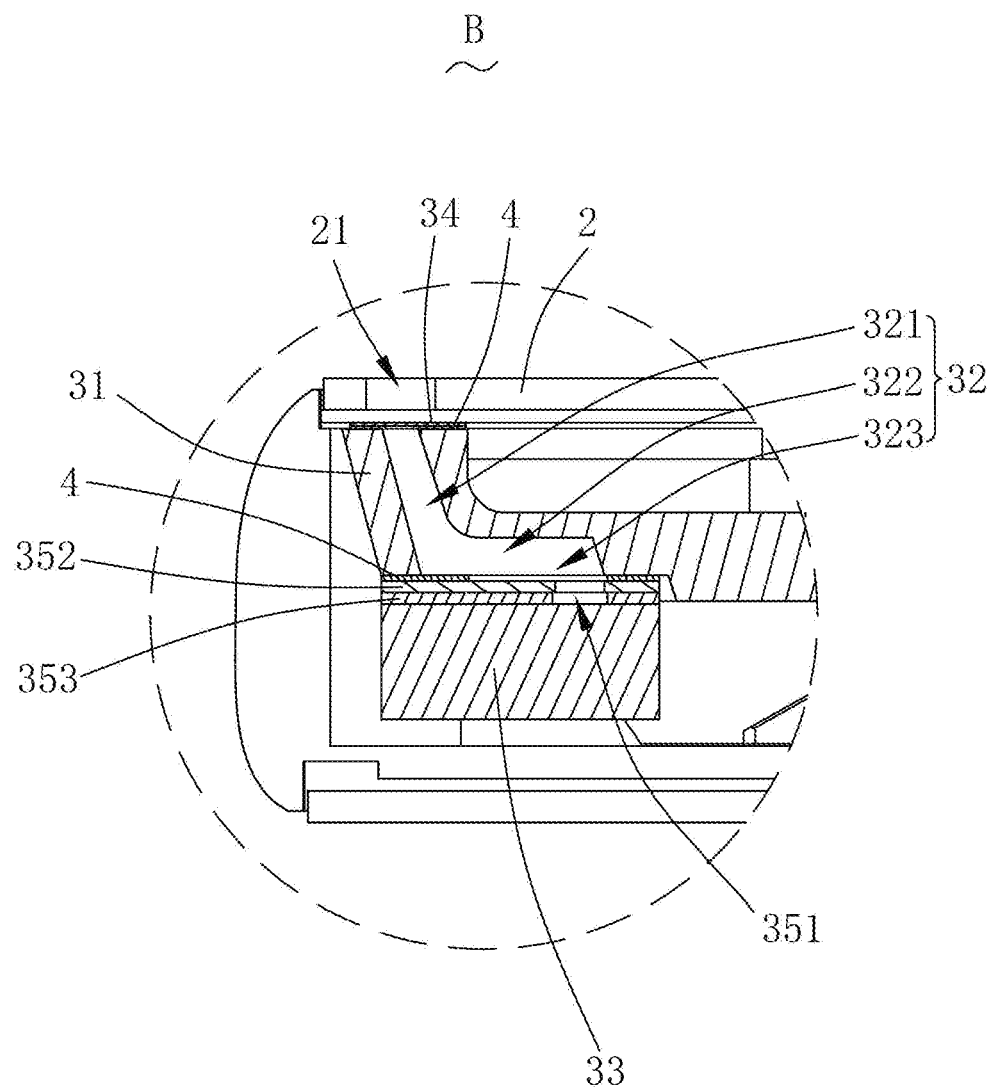
FIG. 4 is an enlarged view of the portion B shown in FIG. 3.

As shown in FIGS. 3-4, the microphone assembly 3 includes a sound guiding portion 31 fixed in the receiving space 10, a sound guiding channel 32 passing through the sound guiding portion 31, a microphone 33 bonded to the sound guiding portion 31, a gas permeable spacer 34 and a reinforcing component 35. The gas permeable spacer 34 and the reinforcing component 35 are respectively provided at two ends of the sound guiding channel 32.

One end of the sound guiding channel 32 faces right towards the sound inlet 21 and communicates with the sound inlet 21. The microphone 33 is bonded to the sound guiding portion 31 and communicates with the other end of the sound guiding channel 32. Sound is transmitted to the sound guiding channel 32 through the sound inlet 21 and then transmitted to the microphone 33 through the sound guiding channel 32, thereby achieving voice picking at a front side of the mobile communication device 100 by the microphone 33, i.e., voice picking at the screen surface. With such a structure, the mobile communication device 100 can directly transmit the pickup when picking up the voice, thereby greatly avoiding interference of ambient noise and thus effectively improving voice quality.

The sound guiding channel 32 includes a first channel 321, a second channel 322 and a third channel 323. The first channel 321 extends in a direction from an end of the sound guiding portion 31 close to the sound inlet 21 towards the housing 1. The second channel 322 is formed by being bent and extending from the first channel 321 and is parallel to the screen 2. The third channel 323 extends from the second channel 322 while being bent towards the housing 1. The sound inlet 21 faces right towards the first channel 321, and communicates with the first channel 321. The microphone 33 is provided to cover the third channel 323. That is, in this embodiment, the sound guiding channel 32 is formed like a "Z" shape or an "N" shape, so that the voice can be transmitted from the sound inlet 21 through the sound guiding channel 32 to the microphone, which in turn picks up the voice.

The gas permeable spacer 34 is fixed at a side of the sound guiding portion 31 close to the screen 2. The gas permeable spacer 34 fully covers an end of the sound guiding channel 32 close to the sound inlet 21. That is, the gas permeable spacer 34 is provided to cover the first channel 321. For example, the gas permeable spacer 34 may be fixedly bonded to the sound guiding portion 31 by a double-sided tape 4.

The arrangement of the gas permeable spacer 34 allows air to circulate freely while effectively preventing foreign matter from entering the sound guiding channel 32, which would otherwise result in blocking, thereby improving call communication reliability of the mobile communication device 100.

The reinforcing component 35 is fixed at an side of the sound guiding portion 31 close to the microphone 33. The reinforcing component 35 is provided with a through hole 351 passing through it. The through hole 351 communicates with the sound guiding channel 32, that is, the through hole 351 communicates with the third channel 323. The microphone 33 is fixed to the reinforcing component 35 and covers the through hole 351.

The reinforcing component 35 may sequentially include a reinforcing layer 352 bonded to the sound guiding portion 31 and a sealed foam layer 353 bonded to the reinforcing layer 352. The microphone 33 is fixed to the sealed foam layer 353. The reinforcing layer 352 can also be fixed to the sound guiding portion 31 by the double-sided tape 4.

The arrangement of the reinforcing layer 352 provides a certain assembling strength for sealing of the sound guiding channel 32, so that the microphone 33 can be sealed on the surface thereof without affecting the sound guiding channel 32, thereby improving the stability thereof. In this embodiment, the reinforcing layer 352 may be a PET sheet, a PI sheet or a steel sheet.

It should be noted that the mobile communication device 100 can be an IPAD, a mobile phone, a tablet computer, or the like.

Compared with the related art, the mobile communication device provided by the present disclosure includes a housing, a screen covering the housing, and a microphone assembly received in the housing, the microphone assembly is configured to include a sound guiding channel and a microphone, a sound inlet is provide on the screen, and one end of the sound guiding channel faces right towards and communicates with the sound inlet, and the microphone is bonded to the other end of the sound guiding channel, thereby achieving a structure for the microphone in which voice can be picked up from the front side, while effectively improving communication quality of the mobile communication device.

The above are only preferred embodiments of the present disclosure. Here, it should be noted that those skilled in the art can make modifications without departing from the inventive concept of the present disclosure, but these shall fall into the protection scope of the present disclosure.

What is claimed is:

1. A mobile communication device, comprising:
    a housing;
    a screen covering the housing and enclosing a receiving space together with the housing; and
    a microphone assembly received in the receiving space, wherein the screen is provided with a sound inlet passing through the screen, the microphone assembly comprises a sound guiding portion fixed in the receiving space, a sound guiding channel passing through the sound guiding portion, and a microphone bonded to the sound guiding portion; the sound guiding channel has one end facing right towards and communicating with the sound inlet, the microphone is bonded to the sound guiding portion and communicates with another end of the sound guiding channel, and sound is transmitted into the sound guiding channel through the sound inlet and then transmitted to the microphone through the sound guiding channel;
    wherein the microphone assembly further comprises a gas permeable spacer fixed to the sound guiding portion, the gas permeable spacer fully covering an end of the sound guiding channel, which faces right towards the sound inlet;
    wherein the gas permeable spacer is fixedly bonded to the sound guiding portion by a double-sided tape;
    wherein the gas permeable spacer further comprises a reinforcing component fixed at a side of the sound guiding portion fixed to the microphone, the reinforcing component is provided with a through hole passing through the reinforcing component, the through hole communicates with the sound guiding channel, and the microphone is fixed to the reinforcing component and covers the through hole.

2. The mobile communication device as described in claim 1, wherein the sound guiding channel comprises a, first channel extending in a direction from an end of the sound guiding portion facing right towards the sound inlet towards the housing, a second Channel being bent and extending from the first channel and being parallel with the screen, and a third channel extending from the second channel while being bent towards the housing; and the sound inlet faces right towards and communicates with the first channel, and the microphone is provided to cover the third channel.

3. The mobile communication device as described in claim 1, wherein the reinforcing component sequentially comprises a reinforcing layer bonded to the sound guiding portion and a sealed foam layer bonded to the reinforcing layer, the microphone being fixed to the sealed foam layer.

4. The mobile communication device as described in claim 3, wherein the reinforcing layer is a polyethylene terephthalate sheet, a polyimide sheet or a steel sheet.

5. The mobile communication device as described in claim 1, wherein the mobile communication device is a mobile phone.

* * * * *